(12) United States Patent
Wada et al.

(10) Patent No.: US 7,426,089 B2
(45) Date of Patent: Sep. 16, 2008

(54) DISK DRIVE WITH HEATER FOR SLIDER AND CONTROL METHOD THEREOF

(75) Inventors: Toshiaki Wada, Kanagawa (JP); Kazuyuki Ishibashi, Kanagawa (JP); Kazunari Tsuchimoto, Kanagawa (JP); Hideki Ohzeki, Kanagawa (JP)

(73) Assignee: Hitachi Gloval Storage Technologies Netherlands B.V., AZ Amsterdam (NL)

( * ) Notice: Subject to any disclaimer, the term of this patent is extended or adjusted under 35 U.S.C. 154(b) by 0 days.

(21) Appl. No.: 11/521,737

(22) Filed: Sep. 14, 2006

(65) Prior Publication Data

US 2007/0058280 A1    Mar. 15, 2007

(30) Foreign Application Priority Data

Sep. 15, 2005    (JP) .............................. 2005-268148

(51) Int. Cl.
*G11B 21/02*    (2006.01)
(52) U.S. Cl. ...................................................... 360/75
(58) Field of Classification Search ........................ None
See application file for complete search history.

(56) References Cited

U.S. PATENT DOCUMENTS

| | | | | |
|---|---|---|---|---|
| 7,193,804 | B1 * | 3/2007 | Kheymehdooz | ............. 360/75 |
| 2002/0191326 | A1 | 12/2002 | Xu et al. | |
| 2003/0174430 | A1 | 9/2003 | Takahashi et al. | |
| 2005/0024775 | A1 | 2/2005 | Kurita et al. | |
| 2006/0039077 | A1 * | 2/2006 | Xu et al. | ....................... 360/75 |

FOREIGN PATENT DOCUMENTS

| | | |
|---|---|---|
| JP | 05-020635 | 1/1993 |
| JP | 09-091911 | 4/1997 |
| JP | 2003-297029 | 10/2003 |

OTHER PUBLICATIONS

State Intellectual Property Office of China (SIPO) office action dated Jan. 1, 2008 for SIPO patent application CN2006-10153422.8.

* cited by examiner

*Primary Examiner*—Andrew L. Sniezek
(74) *Attorney, Agent, or Firm*—Townsend and Townsend and Crew LLP; Rambod Nader

(57) ABSTRACT

Embodiments of the invention allow a heater to reduce the clearance between a head element section and the magnetic section while reducing the risk of collision between the head element section and the magnetic disk during load/unload. In one embodiment, an HDD judges whether a heater is ON or OFF after the load process is started. If the heater is found set to ON, the HDD sets the heater to OFF. With the heater kept OFF, the HDD starts the actuator pivoting. If the heater is found set to OFF, the HDD moves the actuator from the parking position to the magnetic disk with the heater kept OFF. Upon completion of the load process, the HDD goes to the subsequent process. Since the heater is OFF during load, the risk of collision between the head element section and the magnetic disk is reduced.

15 Claims, 11 Drawing Sheets

| Heater Power Table Read(R)/Write(W) | | |
|---|---|---|
| Low Temperature (LT) | Normal Temperature (NT) | High Temperature (HT) |
| T < T_Low_R/W | T_Low_R/W ≦ T ≦ T_High_R/W | T_High_R/W < T |
| Power_LT_R | Power_NT_R | Power_HT_R |
| Power_LT_W | Power_NT_W | Power_HT_W |

Fig.9

| Heater Power Table Load(L)/Unload(UL) | |
|---|---|
| Low Temperature (LT) | Non Low Temperature (NLT) |
| T < T_Low_L/UL | T_Low_L/UL ≦ T |
| Power_L_L/UL | Heater off |

DISK DRIVE WITH HEATER FOR SLIDER AND CONTROL METHOD THEREOF

CROSS-REFERENCES TO RELATED APPLICATIONS

This application claims priority from Japanese Patent Application No. JP2005-268148, filed Sep. 15, 2005, the entire disclosure of which is incorporated herein by reference.

BACKGROUND OF THE INVENTION

The present invention relates to a disk drive and a control method of it and, in particular, concerns the control of a heater provided in the head slider to adjust the clearance between the head element section and the recording disk in the disk drive.

As known, there are a variety of data storage devices which use different types of media such as optical disks, magnetic tapes, and semiconductor memories. Among them, the hard disk drive (HDD) has become so popular as to be one of the indispensable storage devices for today's computer systems. Further, not limited to computers, the hard disk drive is widening its range of applications more and more due to the superior characteristics. For example, HDDs are now used in moving picture recording/reproducing apparatus, car navigation systems, cellular phones, removable memories for digital cameras and so on.

Each magnetic disk used in hard disk drives has a plurality of data tracks formed concentrically. In each data track, a plurality of servo data containing address information and a plurality of data sectors containing user data are recorded. A plurality of data sectors are recorded between servo data. Data can be written to and read from a desired data sector by a head element section of a head slider held on an actuator which is swung to access the data sector according to the address information of the servo data.

To raise the recording density of a magnetic disk, it is important to reduce the clearance between the head element section of the flying head slider and the magnetic disk. Accordingly, several mechanisms have been proposed in order to adjust this clearance. One of them is to provide a heater in the head slider and adjust the clearance by using the heater to heat up the head element section (for example, refer to Patent Document 1 (Japanese Patent Laid-Open No. 1993-20635)). In the present specification, this is called TFC (Thermal Fly height Control). TFC heats up the heater by supplying current to it, which causes the head element section to protrude due to thermal expansion. This can reduce the clearance between the magnetic disk and the head element section.

Even in normal operation, the head element section may also protrude due to thermal expansion. In normal operation, the head element section may exhibit two types of protrusions. One is attributable to the rise of the environmental temperature while the other is to the write element which heats up during data write operation. For the write element to write data to the magnetic disk, current is applied to the coil of the write element to generate a magnetic field. This write current heats up the write element.

In designing a HDD, the protrusion of the head element section attributable to the environmental temperature and that attributable to the write current are taken into consideration in order to avoid collision between the head element section and the magnetic disk. For example, it is therefore likely that the design does not realize satisfactory read performance in low temperature environment while satisfactory read performance is attained in high temperature environment.

TFC reduces the clearance between the head element section and the magnetic disk and gives a solution to such issues as the above-mentioned unsatisfactory read performance and the poor overwrite performance in the initial period of each data write operation. On the other hand, TFC may increase the possibility of collision between the magnetic disk and the head element section since the head element section is more protruded than without TFC. Therefore, controlling the timing of energizing the heater to protrude the head element section is critical in TFC.

As means to retreat HDD head sliders, CSS (Contact Start and Stop) and load/unload systems are known. In an HDD where a load/unload system is employed, a ramp is provided to retreat a head thereto from the magnetic disk surface. The ramp is located near the periphery of the magnetic disk. While the magnetic disk is stopped or the HDD is in power-save mode, the actuator is rested on the ramp, that is, the head slider is retreated from the magnetic disk to the outside of the magnetic disk.

During a load operation, the head slider is brought down from the ramp onto the magnetic disk. In this process, the head slider is more likely to collide with the magnetic disk since its flying attitude is unstable. Also during an unload operation, the head slider may greatly change its attitude since the head slider is moved quickly over the magnetic disk before the actuator is unloaded on the actuator. However, TFC further increases the possibility of collision between the head element section and the magnetic disk during load/unload since the head element section is protruded as mentioned above.

BRIEF SUMMARY OF THE INVENTION

With the above-mentioned situation behind, the present invention was made concerning the technique which uses a heater to protrude a head element section so as to adjust its clearance above the magnetic disk. It is a feature of the present invention to allow this technique to reduce the possibility of collision between the head element section and the magnetic disk.

According to a first aspect of the present invention, there is provided a disk drive which comprises: a slider which flies above a spinning recording disk; a head element section disposed on the slider; a heater which is disposed on the slider and adjusts the clearance between the head element section and the recording disk by protruding the head element section through thermal expansion; an actuator which carries the slider; a ramp onto which a part of the actuator runs in order to retract the slider to the outside of the recording disk; and a controller which in a process to load the retracted slider to the recording disk, keeps the heater in OFF state until a predetermined timing after the slider is moved to the recording disk and the part of the actuator is discharged from the ramp. During the load process, even if the flying attitude is not stable, it is possible to reduce the possibility of collision between the head element section and the recording disk since the heater is kept in OFF state until the predetermined timing after the slider is moved to the recording disk and the actuator is discharged from the ramp.

According to a second aspect of the present invention, the disk drive according to the above-mentioned first aspect further includes a temperature sensor wherein, until a predetermined timing after the slider is moved to the recording disk and the part of the actuator is discharged from the ramp, the controller keeps the heater in OFF state if the detected temperature by the temperature sensor is not lower than a reference temperature, and keeps the heater in ON state if the detected temperature by the temperature sensor is lower than the reference temperature. Temperature-based heater control can reduce the possibility of collision between the head element section and the recording disk while making it possible to read out necessary data.

According to a third aspect of the present invention, there is provided the disk drive according to the above-mentioned second aspect, wherein: when user data is read out from the recording disk, the controller controls the current supplied to the heater so as to supply the largest current if the temperature is lower than a second reference temperature; and the reference temperature for the load process is lower than the second reference temperature. By separately setting the reference temperature more stringently for the load process than for the normal read process, it is possible to more reliably avoid collision between the head element section and the recording disk during load while enabling more reliable reading of data during read.

According to a fourth aspect of the present invention, there is provided the disk drive according to the above-mentioned first aspect, wherein the controller keeps the heater in OFF state until the load process is completed. This can more reliably reduce the risk of the head element section's collision.

According to a fifth aspect of the present invention, the disk drive according to the above-mentioned first aspect further includes a temperature sensor wherein, if the detected temperature by the temperature sensor is lower than a reference temperature, the controller turns ON the heater when a predetermined amount of time has passed after the actuator starts to move. Turning ON the heater when a predetermined amount of time has passed after the actuator starts to move makes it possible to read out necessary data while reducing the risk of the head element section's collision.

According to a sixth aspect of the present invention, there is provided the disk drive according to the above-mentioned fifth aspect, wherein: when user data is read out from the recording disk, the controller controls the current supplied to the heater so as to supply the largest current if the detected temperature is lower than a second reference temperature; and the reference temperature for the load process is lower than the second reference temperature. By separately setting the reference temperature more stringently for the load process than for the normal read process, it is possible to more reliably avoid collision between the head element section and the recording disk during load while enabling more reliable reading of data during read.

According to a seventh aspect of the present invention, there is provided the disk drive according to the above-mentioned first aspect, wherein the controller keeps the heater in OFF state until a predetermined number of servo data are read out by the head element section after the actuator starts to move. This can keep the heater OFF until the attitude of the slider settles.

According to an eighth aspect of the present invention, there is provided a disk drive comprising: a slider which flies above a spinning recording disk; a head element section disposed on the slider; a heater which is disposed on the slider and adjusts the clearance between the head element section and the recording disk by protruding the head element section through thermal expansion; an actuator which carries the slider; a ramp onto which a part of the actuator runs in order to retract the slider to the outside of the recording disk; and a controller which in an unload process to unload the slider to the outside of the recording disk, keeps the heater in OFF state after the actuator starts to move toward the ramp until a part of the actuator rides on the ramp and reaches a parking position thereon. During the unload process, even if the flying attitude is not stable, it is possible to reduce the possibility of collision between the head element section and the recording disk since the heater is kept in OFF state until the actuator rides on the ramp and reaches the parking position thereon after the actuator starts to move toward the ramp.

According to a ninth aspect of the present invention, there is provided the disk drive according to the above-mentioned eighth aspect, wherein during the unload process, the controller drives and controls the actuator by using servo data read out from the recording disk and keeps the heater in ON state while the servo data is read out. This enables accurate reading of servo data.

According to a tenth aspect of the present invention, the disk drive according to the above-mentioned ninth aspect further includes a temperature sensor wherein, while the servo data is read out, the controller keeps the heater ON if the detected temperature by the temperature sensor is lower than a reference temperature. Temperature-based heater control can reduce the possibility of collision between the head element section and the recording disk while making it possible to read out necessary data.

According to an eleventh aspect of the present invention, there is provided a disk drive according to the above-mentioned tenth aspect, wherein: when user data is read out from the recording disk, the controller controls the current supplied to the heater so as to supply the largest current if the temperature is lower than a second reference temperature; and the reference temperature for the unload process is lower than the second reference temperature. By separately setting the reference temperature more stringently for the unload process than for the normal read process, it is possible to more reliably avoid collision between the head element section and the recording disk during unload while enabling more reliable reading of data during read.

According to a twelfth aspect of the present invention, there is provided the disk drive according to the above-mentioned eighth aspect, wherein the controller keeps the heater OFF until the actuator reaches the parking position after the actuator starts to move in order to unload the slider to the outside of the recording disk. This can further reduce the possibility of collision between the head element section and the recording disk.

According to a thirteenth aspect of the present invention, there is provided the disk drive according to the above-mentioned eighth aspect, wherein the unload process is provided with a servo-used mode which controls the actuator by using servo data on the recording disk and servo-not-used mode which controls the actuator without using the servo data, and the heater is kept ON in the servo-used mode and OFF in the servo-not-used mode. This can reduce the possibility of collision between the head element section and the recording disk while allowing reading of servo data.

According to a fourteenth aspect of the present invention, the disk drive according to the above-mentioned thirteenth aspect further includes a temperature sensor wherein, in the servo-used mode, the controller keeps the heater ON if the detected temperature by the temperature sensor is lower than a reference temperature. Temperature-based heater control can reduce the possibility of collision between the head element section and the recording disk while making it possible to read out necessary data.

According to a fifteenth aspect of the present invention, there is provided the disk drive according to the above-mentioned fourteenth aspect, wherein: when user data is read out from the recording disk, the controller controls the current supplied to the heater so as to supply the largest current if the detected temperature is lower than a second reference 1 temperature; and the reference temperature for the unload process is lower than the second reference temperature. By separately setting the reference temperature more stringently for the unload process than for the normal read process, it is possible to more reliably avoid collision between the head element section and the recording disk during unload while enabling more reliable reading of data during read.

According to a sixteenth aspect of the present invention, there is provided a control method in a disk drive having: a slider which flies above a spinning recording disk; a head element section disposed on the slider; and a heater which is disposed on the slider and adjusts the clearance between the head element section and the recording disk by protruding the head element section through thermal expansion, the method comprising the steps of: when a part of an actuator which carries the slider is set on a ramp, driving the actuator so as to move the slider toward the spinning recording disk; and keeping the heater in OFF state until a predetermined timing after the slider is moved to the recording disk and the part of the actuator is discharged from the ramp.

According to a seventeenth aspect of the present invention, there is provided a control method according to the above-mentioned sixteenth aspect, wherein if the detected temperature is lower than a reference temperature, the controller turns ON the heater when a predetermined amount of time has passed after the actuator starts to move. According to an eighteenth aspect of the present invention, there is provided a control method according to the above-mentioned seventeenth aspect, wherein when user data is read out from the recording disk, the largest current is supplied to the heater if the detected temperature is lower than a second reference temperature which is higher than the reference temperature for the load process.

BRIEF DESCRIPTION OF THE DRAWINGS

FIG. 8 shows a table which is consulted for executing temperature-based heater control during read/write in the present embodiment.

FIG. 9 shows a table which is consulted for executing temperature-based heater control during load/unload in the present embodiment.

DETAILED DESCRIPTION OF THE INVENTION

Figure 1:
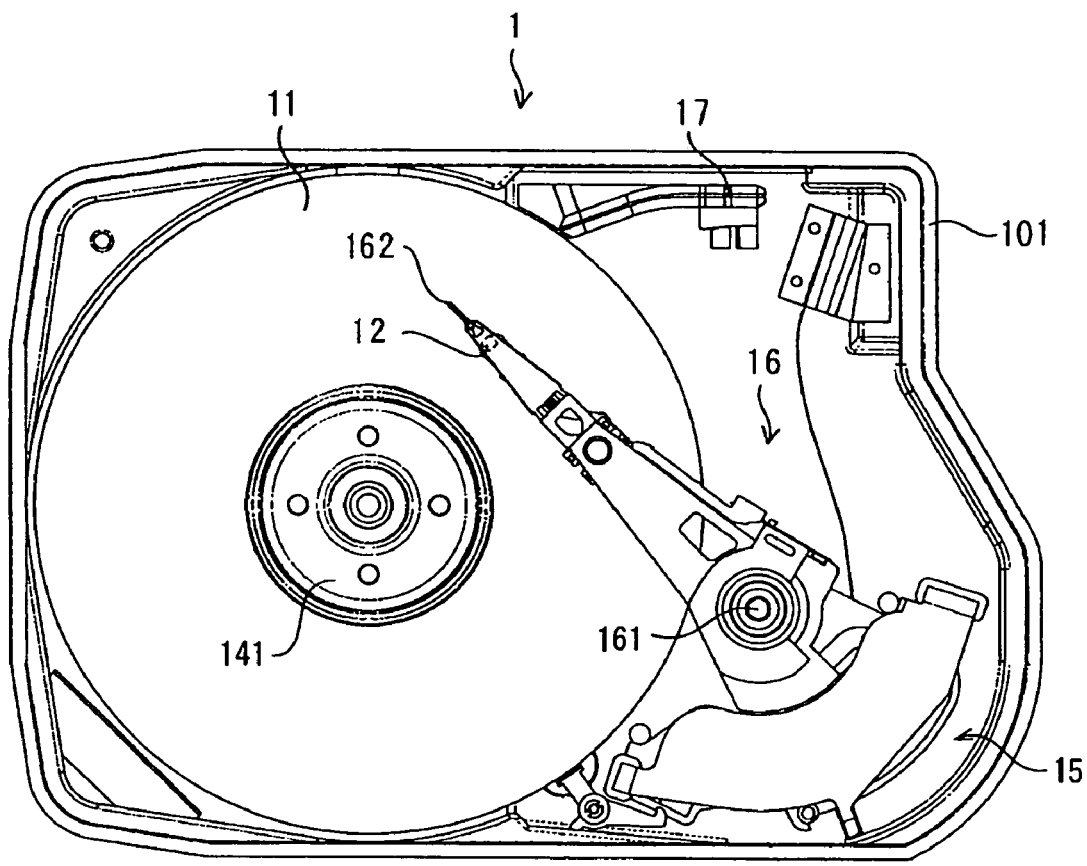
FIG. 1 schematically shows the general configuration of a HDD in the present embodiment.

An embodiment of the present invention will be described below. For clarity, omission and simplification are made where appropriate in the following description and the drawings. In addition, where the same component appears again in another drawing, the same reference numeral is given and its description is omitted for the purpose of clarity.

A disk drive in the present embodiment employs a load/unload system with a ramp to retract a head slider thereto from the magnetic disk. In addition, the head slider is provided with a TFC (Thermal Flyheight Control) heater to adjust the clearance between the head and the medium by means of thermal expansion. One of the characteristics of the present embodiment concerns the control of the TFC heater during load/unload.

As an example of such a disk drive, a hard disk drive (HDD) embodiment is assumed in the following description of the present invention. FIG. 1 schematically shows the configuration of the HDD 1 according to the present embodiment. In FIG. 1, the location of the actuator 16 indicates that the HDD 1 is operating. In FIG. 1, reference numeral 11 refers to a data storage magnetic disk, a non-volatile recording disk whose magnetic layer is magnetized to record data. Via a gasket (not shown in the figure), a base 101 is combined with a top cover (not shown in the figure) to close the upper aperture. They constitute an enclosure to hermetically accommodate the individual components of the HDD 1.

The magnetic disk 11 is fixed to a spindle motor (SPM) (not shown in the figure) by a clamp 141. The SPM drives the magnetic disk 11 to spin at a certain speed. A head slider 12 accesses a recording area of the magnetic disk 11. The head slider 12 comprises a head element section and a slider to which the head section is fixed. In particular, the head slider 12 in the present embodiment is provided with a TFC heater to thermally protrude the head element section so as to adjust its clearance (flying height) above the magnetic disk 11. The configuration of the head slider 12 will be described later.

The actuator 16 carries the head slider 12. In FIG. 1, the actuator 16 is pivotally held by a pivot shaft 161. Pivoted around the pivot shaft 161 by the drive force of a VCM (Voice Coil Motor) 15 as a drive mechanism, the actuator 16 is pivoted in a radial direction of the magnetic disk 11 to move the head slider 12 to a desired position.

The HDD 1 of the present embodiment is a load/unload type HDD provided with a ramp 17 to which the head slider 12 is retracted from the magnetic disk 11. The ramp 17 is mounted to the bottom or side of the base 101. The ramp 17 is located near the periphery of the magnetic disk 11.

Due to the viscosity of air between the spinning magnetic disk 11 and the slider's ABS (Air Bearing Surface) facing the magnetic disk 11, a pressure acts on the head slider 12. The head slider 12 flies low above the magnetic disk 11 as a result of this pressure balancing with the force applied by the actuator 16 toward the magnetic disk 11.

However, if the magnetic disk 11 stops spinning, the head slider 12 touches the surface of the magnetic disk 11 and causes an adhesion phenomenon, which may result in such problems as damage in the data area and stalling of the magnetic disk. Keeping the head slider 12 flying above the magnetic disk 11 would consume a certain level of power. Therefore, when the HDD 1 is powered off or when the magnetic disk 11 is stopped to save power, the actuator 16 unloads/retracts the head slider 12 from the surface of the magnetic disk 11 to the ramp 17.

Figure 2:
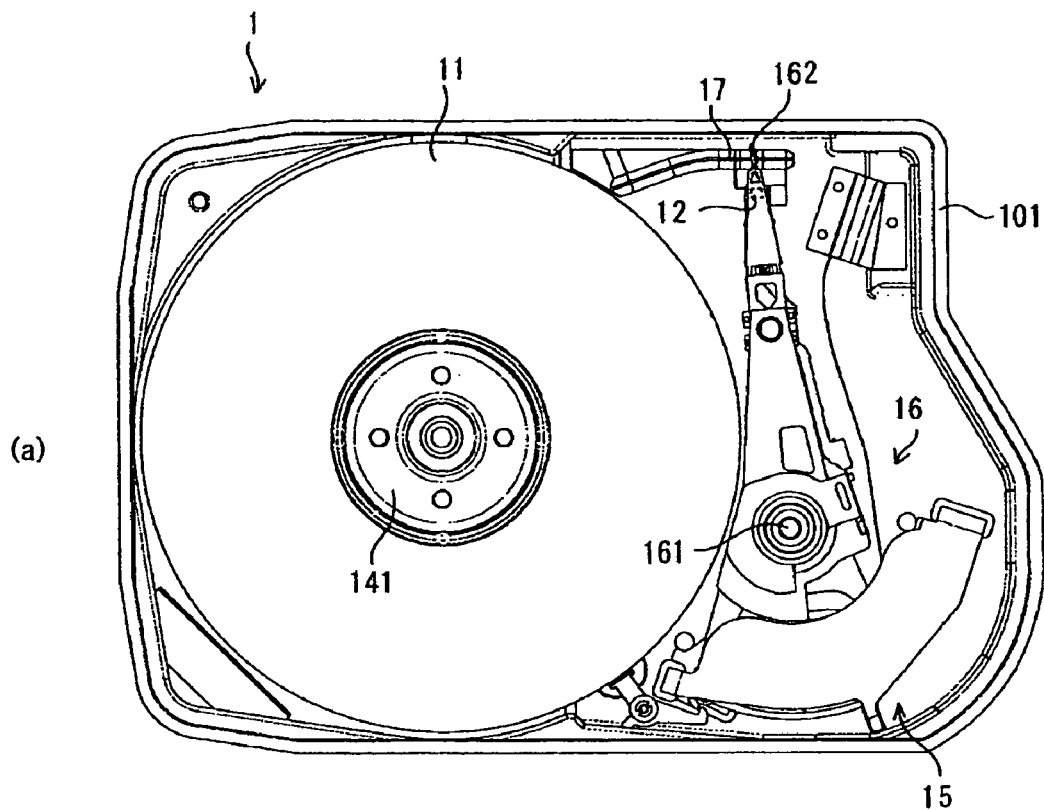
FIG. 2 shows how an actuator moves during a load process in the present embodiment.
Figure 2:
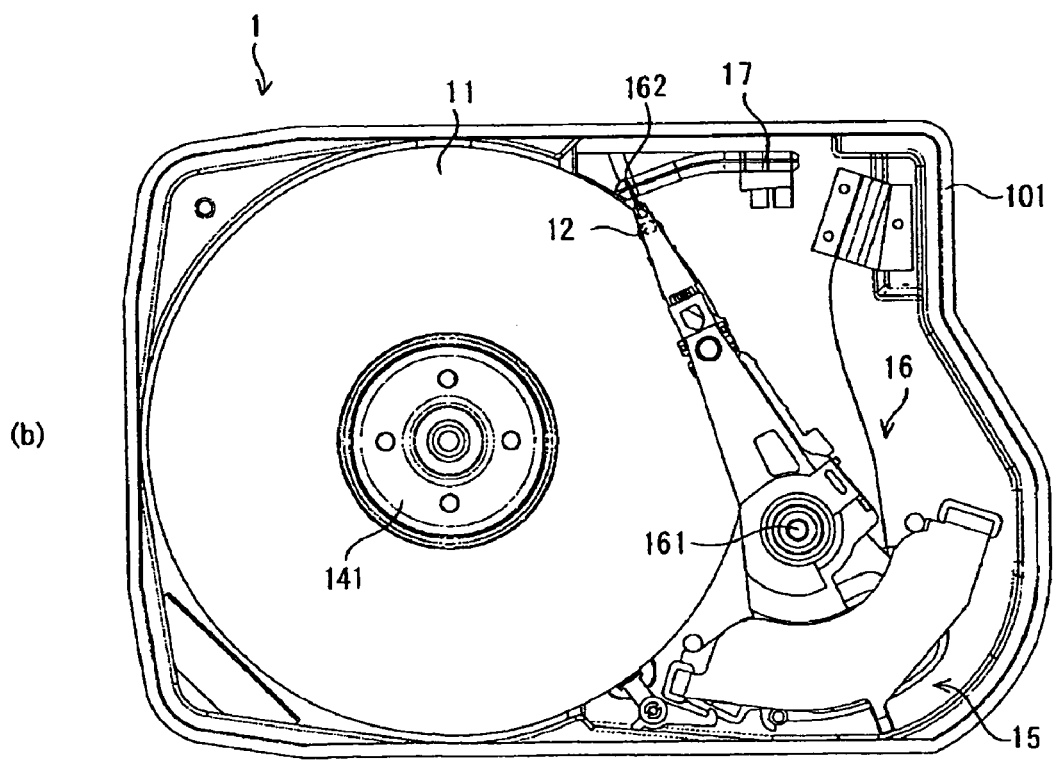

FIG. 2 shows how the head slider 12 is loaded onto the magnetic disk 11 from the ramp 17. In FIG. 2(a), the actuator 16 is at rest in the parking position when the HDD 1 is not active. In this state, the actuator's front end tab 162 rests on the parking surface of the ramp 17. The load operation changes the state of the actuator 16 from the state of FIG. 2(a) through the state of FIG. 2(b) to the state of FIG. 1.

In more detail, the actuator 16 is pivoted toward the magnetic disk 11 to force the tab 162 to get out of the parking surface of the ramp 17 and slide along its sliding surface. The tab 162 arrives at the edge of the ramp 17 near the magnetic disk 11 (FIG. 2(b)). At this point in time, the head slider 12 is already flying above the spinning magnetic disk 11. The actuator 16 is pivoted further toward the center of the magnetic disk 11 to force the tab 162 to take off from the sliding surface of the ramp 17. Consequently, the actuator 16 settles as shown in FIG. 1. In the case of unload, the actuator 16 follows the same sequence in reverse.

Figure 3:
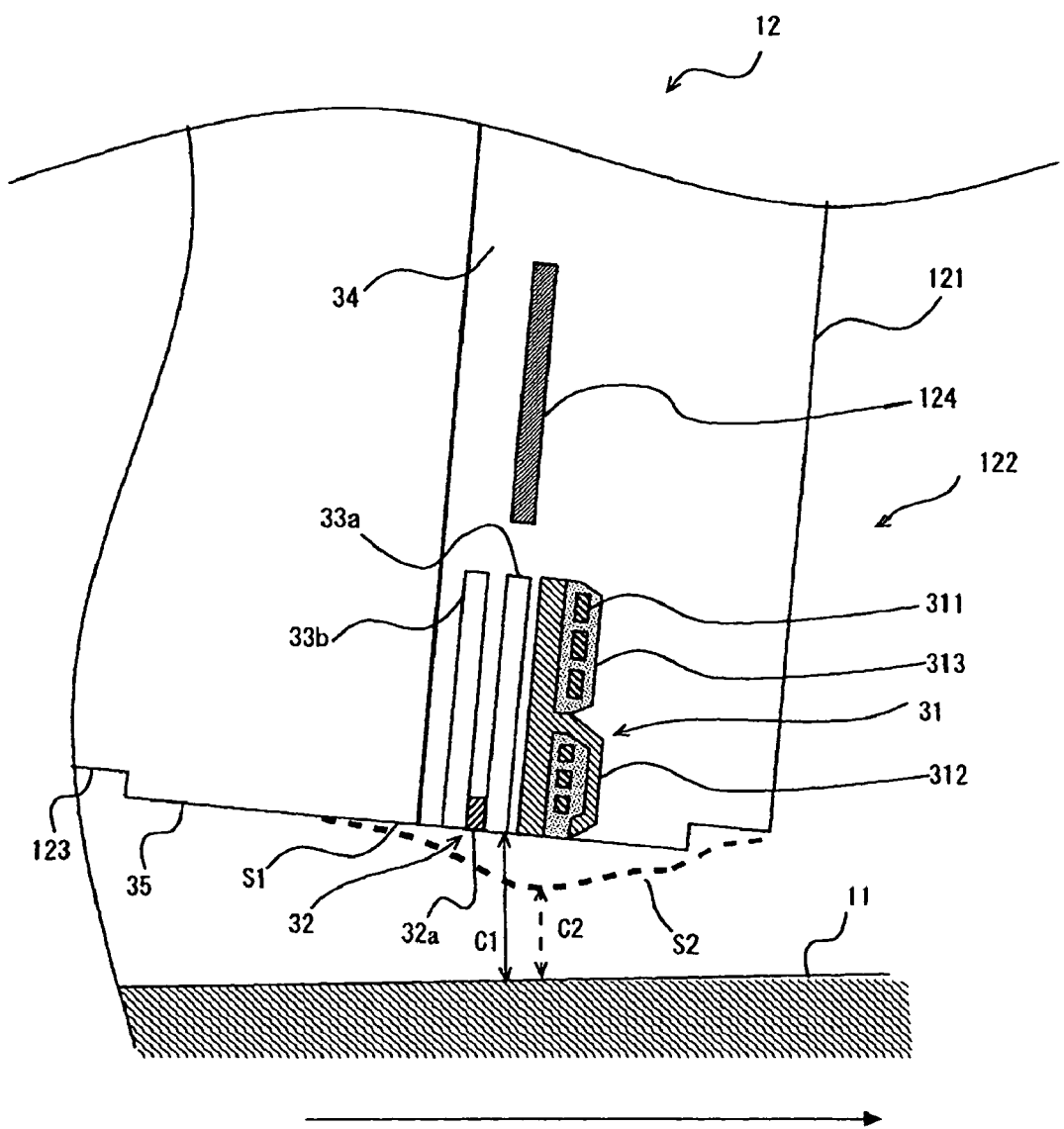
FIG. 3 is a schematic sectional view showing the configuration of a head slider provided with a heater for TFC in the present embodiment.

As mentioned above, TFC is implemented in the HDD 1 of the present embodiment to adjust the clearance between the head element section and the magnetic disk 11. FIG. 3 is a cross sectional view of a portion of the TFC head slider 12 around its air outflow edge (trailing edge) 121. In FIG. 3, the magnetic disk 11 rotates from left to right. The head slider 12 comprises the head element section 122 and the slider 123 which supports the head element section 122. Note that the TFC of the present embodiment may be applied to both horizontal and perpendicular magnetic recording HDDs.

The head element section 122 reads and writes magnetic data from and to the magnetic disk 11. The head element section 122 has a read element 32 and, on its trailing side, a write element 31. The write element 31 is an inductive device which records magnetic data on the magnetic disk 11 by flowing a current along a write coil 311 to generate magnetic field between magnetic poles 312. The read element 32 is a magnetoresistive device having a magnetoresistive element 32a which shows magnetic anisotropy. Magnetic data recorded on the magnetic disk 11 is retrieved according to its resistance which changes depending on the magnetic field from the magnetic disk 11.

By using thin film fabrication processes such as plating, sputtering and polishing, the head element section 122 is formed on an AlTiC board which constitutes the slider 123. The magnetoresistive element 32a is sandwiched by magnetic shields 33a and 33b. The write coil 311 is surrounded by a dielectric film 313. In addition, the head element section 122 has a protective film 34 of alumina or the like formed around the write element 31 and read element 32. Note that on the air bearing surface (ABS) 35 which faces the magnetic disk 11, a protective carbon film is formed with a thickness of several nm. This provides abrasion resistance in case of contact with the magnetic disk 11 and protects the head element section 122 from corrosion.

Near the write element 31 and read element 32, the heater 124 is disposed. The heater 124 is a thin film resistor formed by using thin film process. In the present embodiment, the heater 124 is disposed deeper than the head element section 122 when viewed from the magnetic disk 11. For example, the thin film resistor of the heater 124 can be obtained by forming a thin zigzag permalloy line in a certain area and filling the area with alumina.

If the arm electronics (AE 13) supplies current to the heater 124, heat from the heater 124 deforms/protrudes the head element section 122. When not heated, the ABS of the head slider 12 has a profile as indicated by S1. In this case, the distance or clearance between the head element section 122 and the magnetic disk is as indicated by C1. When heated up by the heater 124, it protrudes as indicated by a broken line S2 shown in FIG. 3. The head element section 122 comes closer to the magnetic disk 11. Therefore, the resulting clearance C2 is smaller than clearance C1.

Although the heater 124 is located deeper than and separated from the head element section 122 so as not to give thermal damage to the head element section 122, thermal expansion of the material surrounding the heater 124 propagates to the head element section 122. Consequently, the material surrounding the head element section 122 expands so as to protrude the head element section 122 toward the magnetic disk 11. Note that FIG. 3 is dimensionally not accurate since it is a schematic diagram. For example, the protrusion profile S2 shows a nanometer-order (several nanometers) protrusion.

Figure 4:
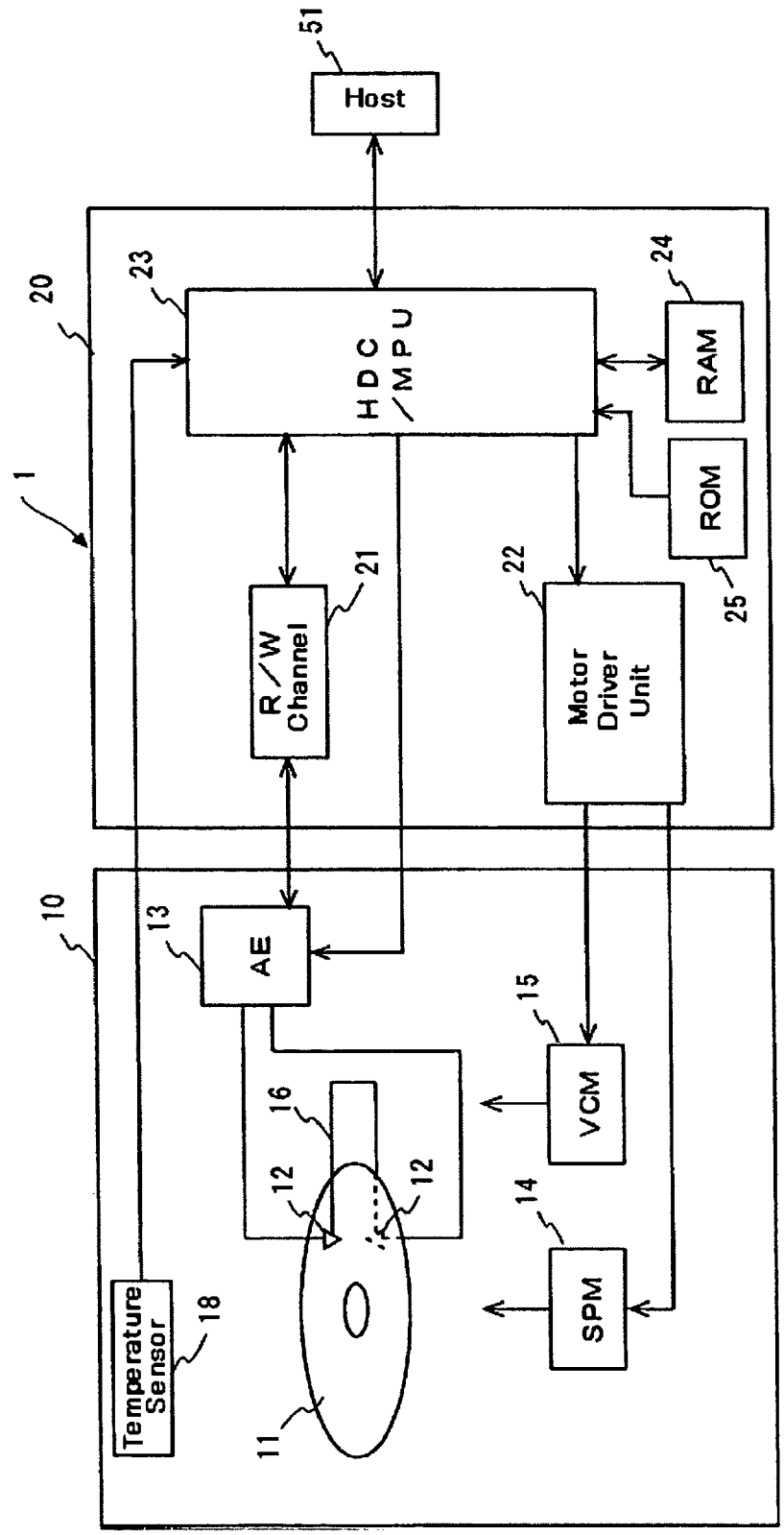
FIG. 4 is a block diagram which schematically shows the functional general configuration of an HDD in the present embodiment.

As mentioned above, unique to the HDD 1 of the present embodiment is TFC during load/unload. Accordingly, the following describes the general control configuration of the HDD 1 with reference to FIG. 4. In an enclosure 10, the HDD 1 has a magnetic disk 11, head slider 12, arm electronic circuit (AE: Arm Electronics) 13, SPM 14, VCM 15, actuator 16 and temperature sensor 18 as shown in FIG. 4. Note that the ramp 17 is omitted in FIG. 4.

In addition, the HDD 1 has a circuit board 20 fixed to the outside of the enclosure 10. On the circuit board 20, ICs are mounted which include a read/write channel (R/W channel) 21, a motor driver unit 22, a hard disk controller (HDC)/MPU-integrated circuit (hereinafter HDC/MPU) 23, a RAM 24 and a ROM 25. Note that these circuits may be either integrated in a single IC or formed across a plurality of separate ICs.

User data from an external host 51 is received by the HDC/MPU 23 and written to the magnetic disk 11 by the head slider 12 via the R/W channel 21 and the AE 13. As well, user data stored on the magnetic disk 11 is read out by the head slider 12 and output to the external host 51 from the HDC/MPU 23 via the AE 13 and the R/W channel 21.

According to control data from the HDC/MPU 23, the motor driver unit 22 drives the SPM 14. The magnetic disk 11 in the figure has a recording surface on each side and one head slider 12 is provided for each recording surface. The motor driver unit 22 drives the VCM 15 according to control data (called DACOUT) from the HDC/MPU 23. Note that the present embodiment may have either one or plural magnetic disks 11 and a recording surface may be formed on either each side or only one side of each magnetic disk 11.

For access on a magnetic disk 11, the AE 13 chooses one head element section 122 from the plural head element sections 122. Regenerative signal retrieved by the selected head element section 122 is amplified (pre-amplified) at a certain gain by the AE 13 and sent to the R/W channel 21. Recording signal from the R/W channel 21 is also sent by the AE 13 to the selected head element section 122. In addition, the AE 13 supplies current to the heater in order to adjust the clearance. The AE 13 serves as an adjustment circuit to adjust the magnitude of this current (power). Unique to the present embodiment is current supply control during load/unload. This will be described later in detail.

The R/W channel 21 executes read processing. In the read processing, the R/W channel 21 extracts data from the read signal supplied from the AE 13 and decodes the data. The read data comprises user data and servo data. After being decoded, the read user data is supplied to the HDC/MPU 23. As well, the R/W channel 21 executes write processing according to control signal from the HDC/MPU 23. In the write processing, the R/W channel 21 code-modulates the write data supplied from the HDC/MPU 23 and further converts the code-modulated write data to a write signal to be sent to the AE 13.

The MPU of the HDC/MPU 23 operates according to microcodes loaded into the RAM 24. When the HDD 1 is started, not only microcodes which are to run on the MPU but also data required for control and data processing are loaded into the RAM 24 from the magnetic disk 11 or the ROM 25. In addition to data processing-related operations such as read/write processing control, command execution order management, servo signal-used head slider 12 positioning control (servo control), interface control and defect management, the HDC/MPU 23 executes general control of the HDD 1. In particular, the HDC/MPU 23 of the present embodiment executes TFC.

Figure 5:
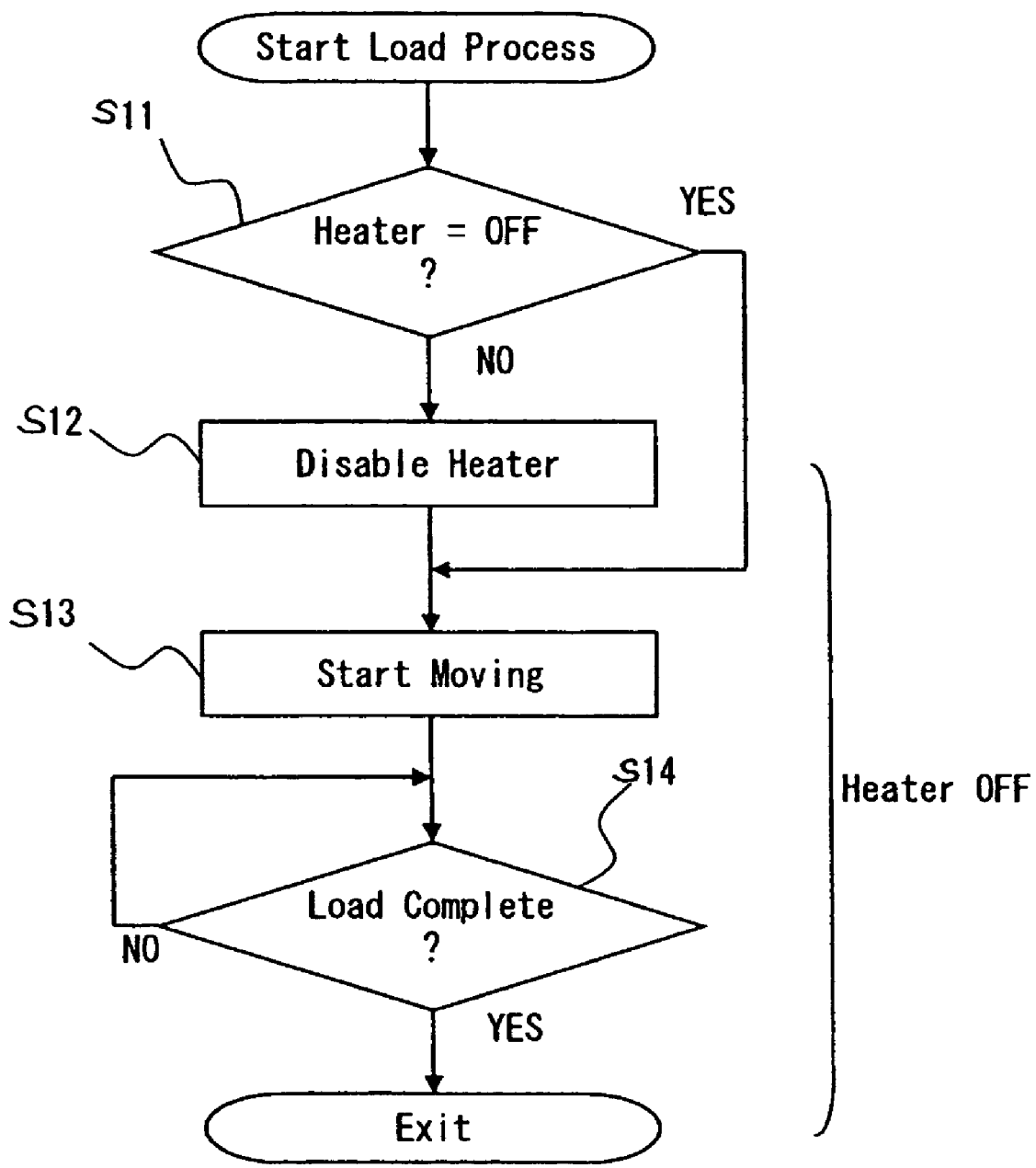
FIG. 5 is a flowchart showing how heater control is done during load in the present embodiment wherein this heater control is independent of the temperature.

Firstly, the following provides a description of TFC during the load process in the present embodiment. Preferably, the heater 124 is turned OFF whenever the load process is done from the ramp 17 to the magnetic disk 11. With reference to a flowchart of FIG. 5, a detailed description is given below. In the first step after the load process is started, the HDD 1 judges whether the heater 124 is ON or OFF (S11). If the heater 124 is found set to ON in step S11, the HDD 1 sets the heater 124 to OFF (no use), that is, disables it by setting the supply current to 0 (S12). With the heater 124 kept in OFF state, the HDD 1 starts the actuator 16 pivoting, namely moving from the parking position of the head slider 12 (S13).

If the heater 124 is found set to OFF in step S11, the HDD 1 starts the actuator 16 pivoting, namely moving toward the magnetic disk 11 from the parking position of the head slider 12 (tab 162) with the heater 124 kept in OFF state (S13). Then, upon completion of the load process (S14), the HDD 1 exits the load process to go to the subsequent sequence process.

During the load process, the head slider 12 goes down to the recording surface of the magnetic disk 11 from the edge of the ramp 17 on the magnetic disk 11 side. During this process, the possibility of collision between the magnetic disk 11 and the head element section 122 is high since the attitude of the flying head slider 12 is not stable. Note that TFC intends to protrude the head element section 122 toward the magnetic disk 11 through thermal expansion by using heat from the heater 124. This increases the possibility of collision between the head element section 122 and the magnetic disk 11 since the clearance between the head element section 122 and the magnetic disk 11 is decreased.

In the present embodiment as described above, the heater 124 is kept OFF during each load process so as not to protrude the head element section 122 while the head slider 12 is going down to the magnetic disk 11 from the ramp 17. This TFC can suppress the occurrence of damage to the head element section 122 during the load process when the possibility of collision between the head element section 122 and the magnetic disk 11 is otherwise high.

The condition for completing the load process may be determined in some of several ways depending on the design of the HDD 1. The HDD 1 judges that the load is complete if the flying attitude of the head slider has settled. Typically, at the timing when the last of a predetermined number of successive servo data is read out from the magnetic disk 11 by the head element section 122, the HDD 1 judges that the load is complete. In this case, the HDD 1 keeps the heater 124 in OFF state until a predetermined number of successive servo data are read out by the head element section 122 after the head slider 12 starts to move. TFC in the subsequent process is done according to the routine for that process.

To surely avoid collision between the head slider 12 and the magnetic disk 11, it is preferable to keep the heater 124 in OFF state until the load process is complete (S14) after the slider 12 has started to move (S13). However, turning off the heater 124 during the load process intends to reduce the possibility of collision between the magnetic disk 11 and the head element section 122 while the head slider 12 is moved down to the magnetic disk 11 and its attitude is still unstable after moved. Therefore, it may also be effective to keep the heater 124 off only during a critical part of the load process. For example, the HDD 1 may keep the heater 124 in OFF state until a reference amount of time has passed after the head slider 12 starts to move.

Another preferable implementation is such that TFC during load is executed dependently on the environmental temperature. The amount of protrusion of the head element section 122 changes depending on the environmental temperature (ambient temperature) as well as heat from the heater 124. It is therefore preferable that the heater 124 is ON during the load process if the head element section 122 must be protruded by TFC since its protrusion is too small to read servo data due to the ambient temperature in a low temperature range.

This load process is described in detail with reference to FIG. 6. In the first step after the load process is started, the HDD 1 judges whether the environmental temperature is in the predetermined low temperature range (S21). If out of the low temperature range (S21), the HDD 1 executes steps S22 through S25 which are identical to the corresponding ones (S11 through S14) described with reference to FIG. 5.

If the environmental temperature is in the low temperature range in step S21, the HDD 1 judges whether the heater 124 is ON or OFF (S26). If the heater 124 is found set to OFF (YES in S26) in S26, the HDD 1 sets the heater 124 to ON (use) (S27). That is, the HDD 1 energizes the heater 124 by supplying a predetermined current to it. If the heater 124 is found set to ON (NO in S26) in step S26, the HDD 1 maintains this state.

With the heater 124 kept in ON state, the HDD 1 starts the actuator 16 pivoting, namely moving from the parking position of the head slider 12 (S28). After the head element section 122 is moved down to the magnetic disk 11, the HDD 1 reads out servo data. Flying above the magnetic disk 11, the head element section 122 can accurately read out servo data since the head element section 122 is protruded as a result of thermal expansion due to heat from the heater 124. If a predetermined number of successive servo data are read out, it is judged that the load process is complete (S29). The HDD 1 exits the load process and starts the subsequent process.

Thus, since the heater 124 is ON during the load process only if the environment temperature is low, it is possible to accurately read out servo data while avoiding collision between the head element section 122 and the magnetic disk 11. In the above example, the heater 124 is set to ON when the actuator 16 begins to pivot. To further reduce the possibility of collision between the head element section 122 and the magnetic disk 11, it is also preferable to set the heater 124 to ON if a predetermined amount of time has passed without being able to read out servo data after the head slider 12 starts to move.

Figure 7:
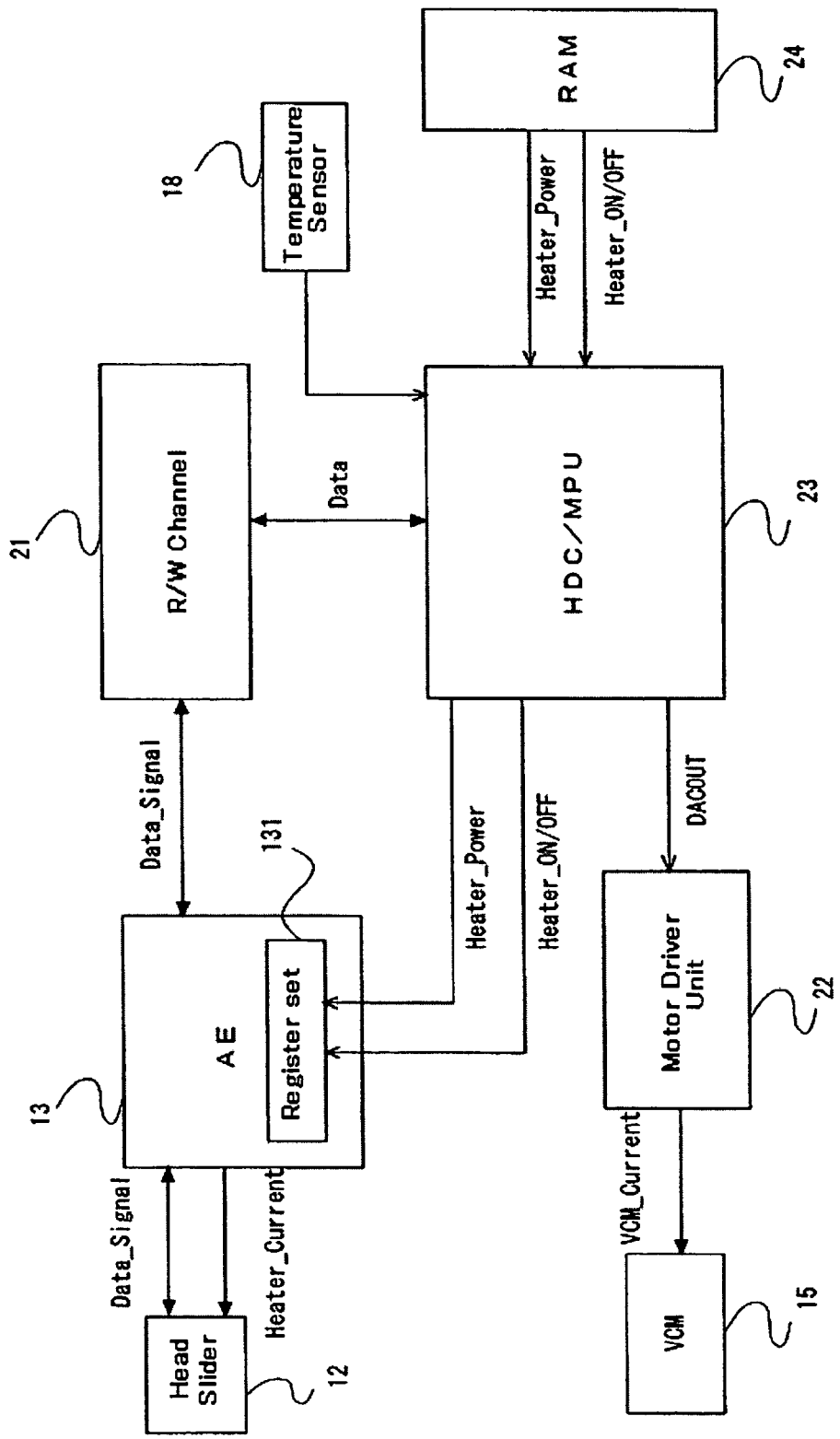
FIG. 7 is a block diagram showing signals which are transferred between components in the present embodiment to execute the load/unload process with TFC.

With reference to a block diagram of FIG. 7, a circuit configuration to execute TFC during the load process is described below. The load process and heater 124 control are performed by the HDC/MPU 23. Specifically, the HDC/MPU 23 registers heater 124 ON/OFF control data (Heater_ON/OFF) and supply power data (Heater_Power) at a register set 131 in the AE 13. The AE 13 supplies current (Heater Current) to the heater 124 according to the control data registered at the respective registers.

Figure 6:
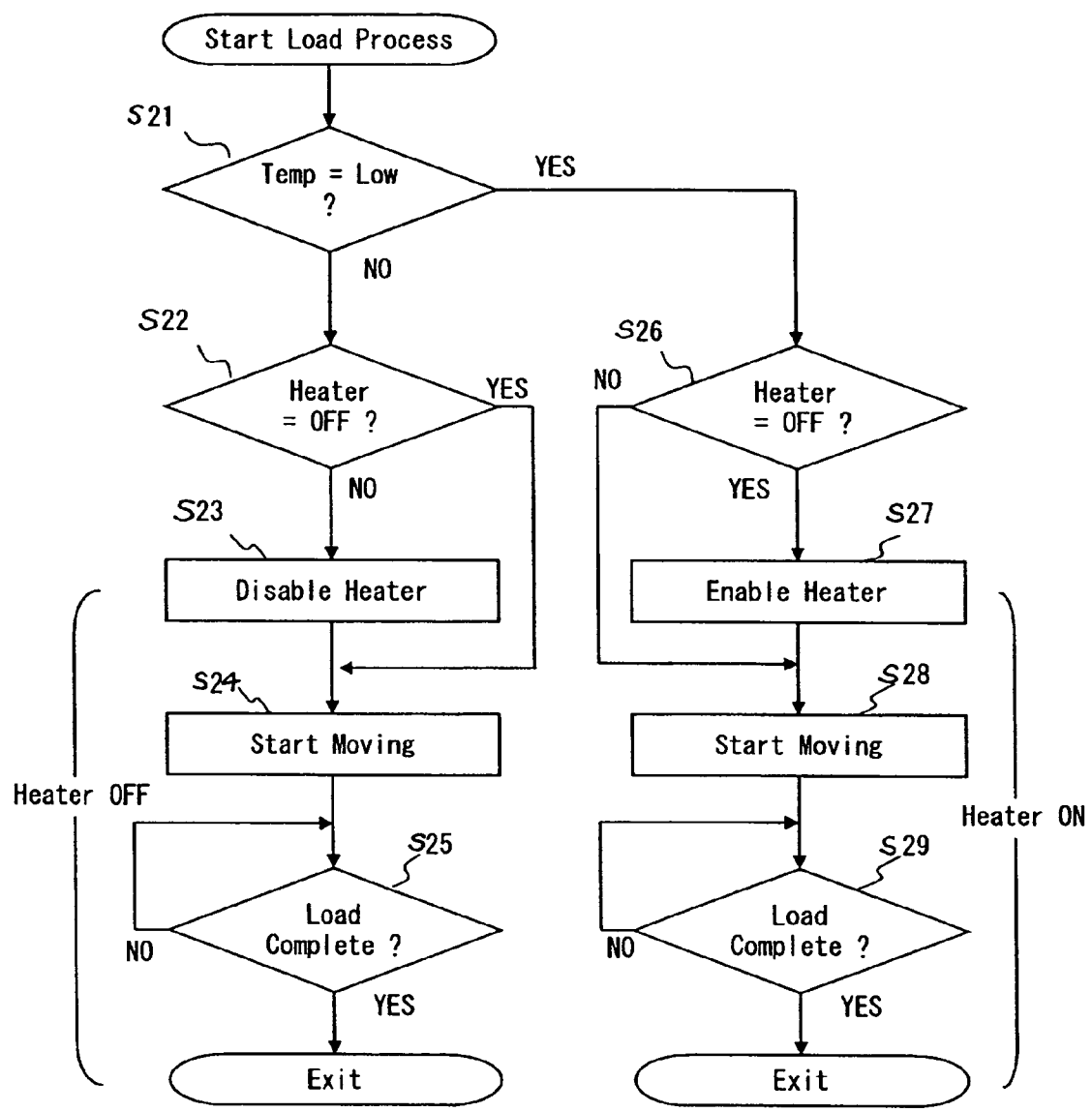
FIG. 6 is a flowchart showing how temperature-based heater control is done during load in the present embodiment.

The flows described with reference to FIG. 6 are exemplarily assumed here. If the HDC/MPU 23 receives a read/write command from the host 51, it starts the load process. The HDC/MPU 23 obtains a detected temperature from the temperature sensor 18, consults a table stored in the RAM 24 and determines whether to set the heater 124 to ON or OFF. That table will be described later.

To turn ON the heater 124, data indicative of this decision (Heater_ON/OFF) and the level of power (in terms of current) to be supplied to the heater (Heater_Power) are set to the register set 131 in the AE 13. To turn OFF the heater 124, data indicative of this decision (Heater_ON/OFF) is set to the register set 131. The AE 13 supplies a current to the heater 124 according to the set control data.

The HDC/MPU 23 outputs data DACOUT to the motor driver unit 22. Data DACOUT concerns the VCM current. The motor driver unit 22 supplies a VCM current (VCM_Current) to the VCM 15 according to the data, starting the actuator 16 pivoting. The head element section 122 goes down to the magnetic disk 11 and begins to read servo data and send its signal (Data_Signal) to the R/W channel 21 via the AE 13. Servo data (Data) generated by the R/W channel 21 are obtained by the HDC/MPU 23. When a predetermined number of successive servo data are accurately read out, the HDC/MPU 23 judges that the load process is complete and goes to the subsequent process.

FIGS. 8 and 9 show tables which are consulted by the HDC/MPU 23 to control the heater 124. FIG. 8 shows a table which is used by the HDC/MPU 23 for the normal read/write process. Shown in FIG. 9 is a table which is consulted for the load/unload process. TFC during the unload process will be described later. For normal data read from the magnetic disk 11, a heater power (Power_xT_R) is registered for each of three temperature segments: low temperature, normal temperature and high temperature ranges. Likewise, for normal data write to the magnetic disk 11, a heater power (Power_xT_W) is registered for each of the three temperature ranges.

In the same temperature range, heater power for write (Power_xT_W) is smaller than heater power for read (Power_xT_R). This is because the write current causes protrusion. In addition, a larger heater power is registered for a lower temperature range. This is expressed as Power_LT_R>Power_NT_R>Power_HT_R and Power_LT_W>Power_NT_W>Power_HT_W. The largest power (current) is applied when the temperature is in the low temperature range below criterion temperature T_Low_R/W. Note that it is also possible to define different temperature range sets for read and write respectively.

In the case of the load/unload process, a low temperature range and a non-low temperature range are defined. If the temperature detected by the temperature sensor 18 is in the low temperature range below criterion temperature T_Low_L/UL, the heater 124 is required to be ON and power POWER_L_L/UL is supplied to it. If the temperature detected by the temperature sensor 18 is in the non-low temperature range beyond criterion temperature T_Low_L/UL, the heater 124 is required to be OFF.

Preferably, temperature T_Low_L/UL which serves as a threshold in ON/OFF controlling of the heater 124 for the load/unload process is lower than temperature T_Low_R/W which defines the low temperature range for the normal read/write process. In addition to such temperature range setting, it is also preferable that power Power_L_L/UL which is to be supplied to the heater 124 during load/unload is smaller than power Power_LT_R which is to be supplied to the heater 124 during read. This is because during load/unload, it is important to reduce the possibility of collision between the head element section 122 and the magnetic disk 11 and reading servo data allows a larger clearance than the normal read. Thus, heater control is conditioned more stringently during the load/unload than during the normal read. This makes it possible to prevent shocks to the head element section 122 while enabling accurate reading of servo data.

While a constant heater power is set to each temperature range in the above examples, it is also possible to determine the heater power as a function of the detected temperature. For example, heater powers are respectively set to four predetermined temperatures LT, NT, HT and HT_Limit. Between adjacent predetermined temperatures, the heater power is calculated as a linear function of the temperature. For example, if heater powers Power_LT and Power_NT are respectively set to LT and NT, the heater power at temperature T between LT and NT may be given by:

$$Power=(Power\_LT-Power\_NT)/(NT-LT)\times(NT-T)+Power\_NT$$

Heater powers between other predetermined temperatures can also be calculated in the same manner. In the temperature ranges below LT and beyond HT_Limit, constant heater powers may be assigned. Predetermined temperatures and as many heater powers are set for read and write separately. Heater powers during the load/unload process can also be determined by using an arithmetic expression. Preferably also in this case, TFC criteria are set more stringently for the load/unload process than for the normal read/write. Specifically, it is preferable that the temperature below which the heater 124 is to be ON is lower than that for read/write. For the same temperature, it is preferable to set a smaller heater power than that for read/write.

Figure 10:
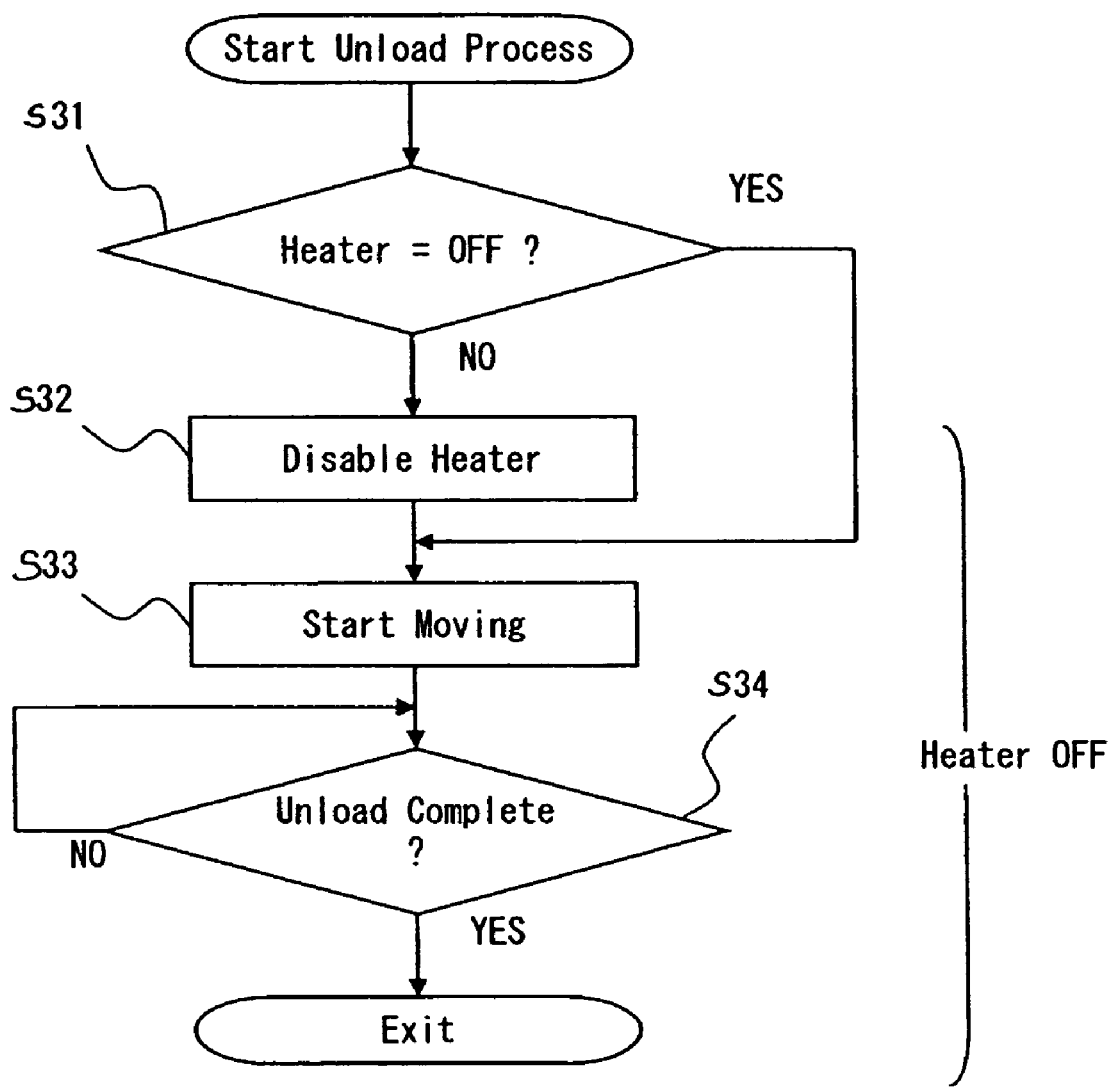
FIG. 10 is a flowchart showing how heater control is done during unload in the present embodiment wherein this heater control is independent of the temperature.

The following provides a description of TFC during the unload process in the present embodiment. Preferably, the HDD 1 turns OFF the heater 124 whenever unload is done to the ramp 17 from the magnetic disk 11. With reference to a flowchart of FIG. 10, a detailed description is given below. In the first step after the unload process is started, the HDC/MPU 23 judges whether the heater 124 is ON or OFF (S31).

If the heater is found set to ON in step S31, the HDC/MPU 23 sets the heater 124 to OFF (no use) (S32). With the heater 124 kept in OFF state, the HDC/MPU 23 starts the actuator 16 pivoting, namely moving the head slider 12 from the current position (S33). The actuator 16 begins to pivot from the current position toward the ramp 17 or the periphery of the magnetic disk 11. If the current position is near the periphery, the actuator 16 is pivoted toward the inner side before pivoted toward the ramp 17. This is done to give enough momentum to step onto the ramp.

If the heater 124 is found set to OFF in step S31, the HDC/MPU 23 starts the actuator 16 pivoting, namely moving the head slider 12 from the current position with the heater 12 kept in OFF state (S33). The tab 162 climbs the sliding surface of the ramp 17 and reaches the parking position to complete the unload process (S34). At this time, the HDC/MPU 23 exits the unload process and goes to the subsequent sequence process.

During the unload process, the head slider 12 moves over the magnetic disk 11 at high speed. During this process, the possibility of collision between the magnetic disk 11 and head element section 122 is high since the attitude of the flying head slider 12 is not stable. In the present embodiment as described above, since the heater 124 is kept OFF during each unload, it is possible to suppress the occurrence of damage to the head element section 122 during the unload process when the possibility of collision between the head element section 122 and the magnetic disk 11 is particularly high.

Another preferable implementation is such that TFC during unload is executed dependently on the environmental temperature. The amount of protrusion of the head element section 122 changes depending on the environmental temperature (ambient temperature) as well as heat from the heater 124. It is therefore preferable that the heater 124 is ON during the load process if the head element section 122 must be protruded by TFC since its protrusion is too small to read servo data and the possibility of collision with the magnetic disk 11 is reduced due to the ambient temperature in a low temperature range.

The unload process is provided with servo control mode and VCM current control mode. In servo control mode, servo data is used to drive and control the actuator 16. In VCM current control mode, the magnitude of current to the VCM 15 is controlled to drive the actuator 16 without using servo data. The unload process either uses only the VCM current control mode to retract the head slider 12 or initially uses the servo control mode and then uses the VCM current control mode to control and drive the actuator 16. When the detected temperature is in a low temperature range, it is possible to realize accurate reading of servo data by setting the heater 124 to ON during the servo control mode.

Figure 11:
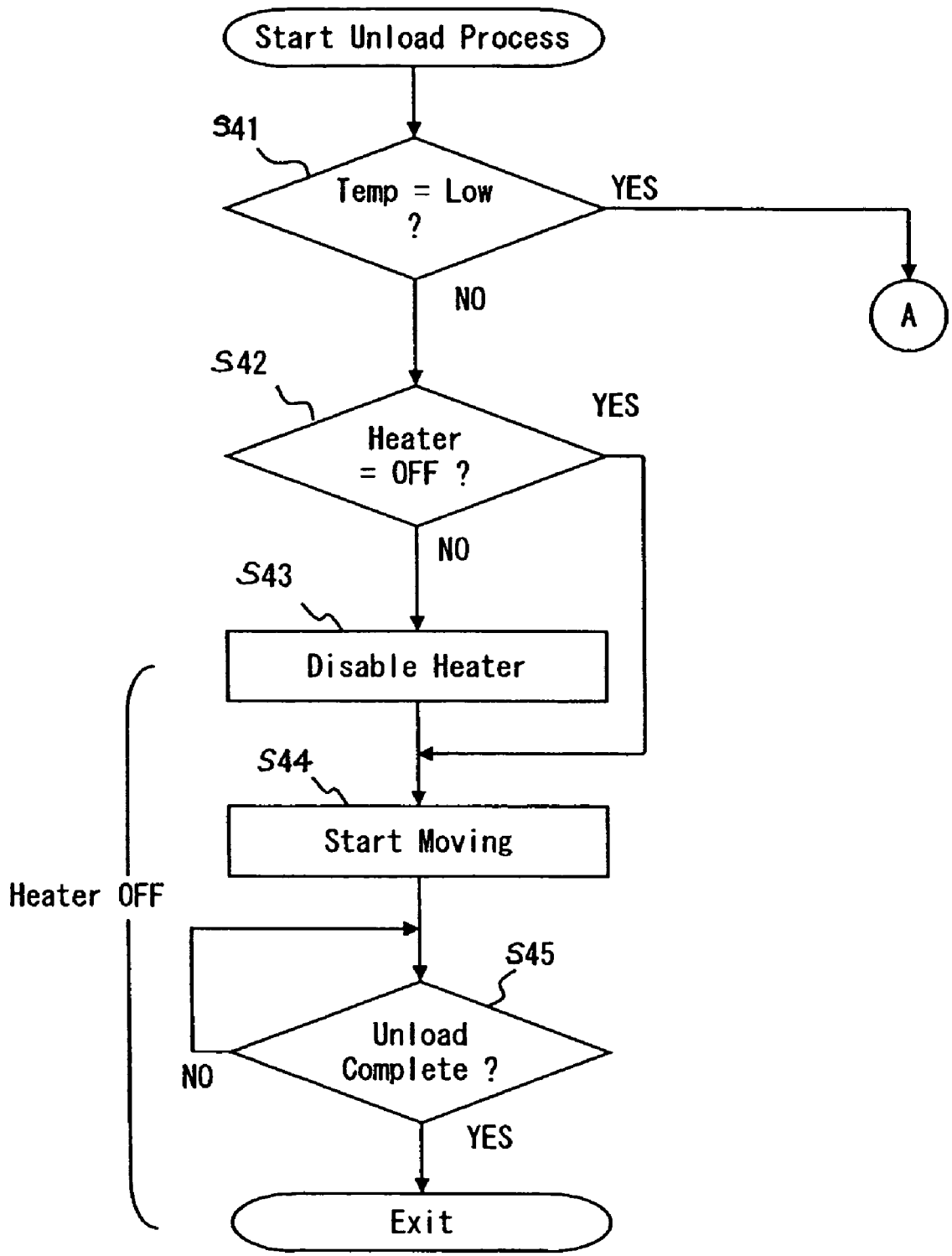
FIG. 11 is a flowchart showing how temperature-based heater control is done during unload in the present embodiment.
Figure 12:
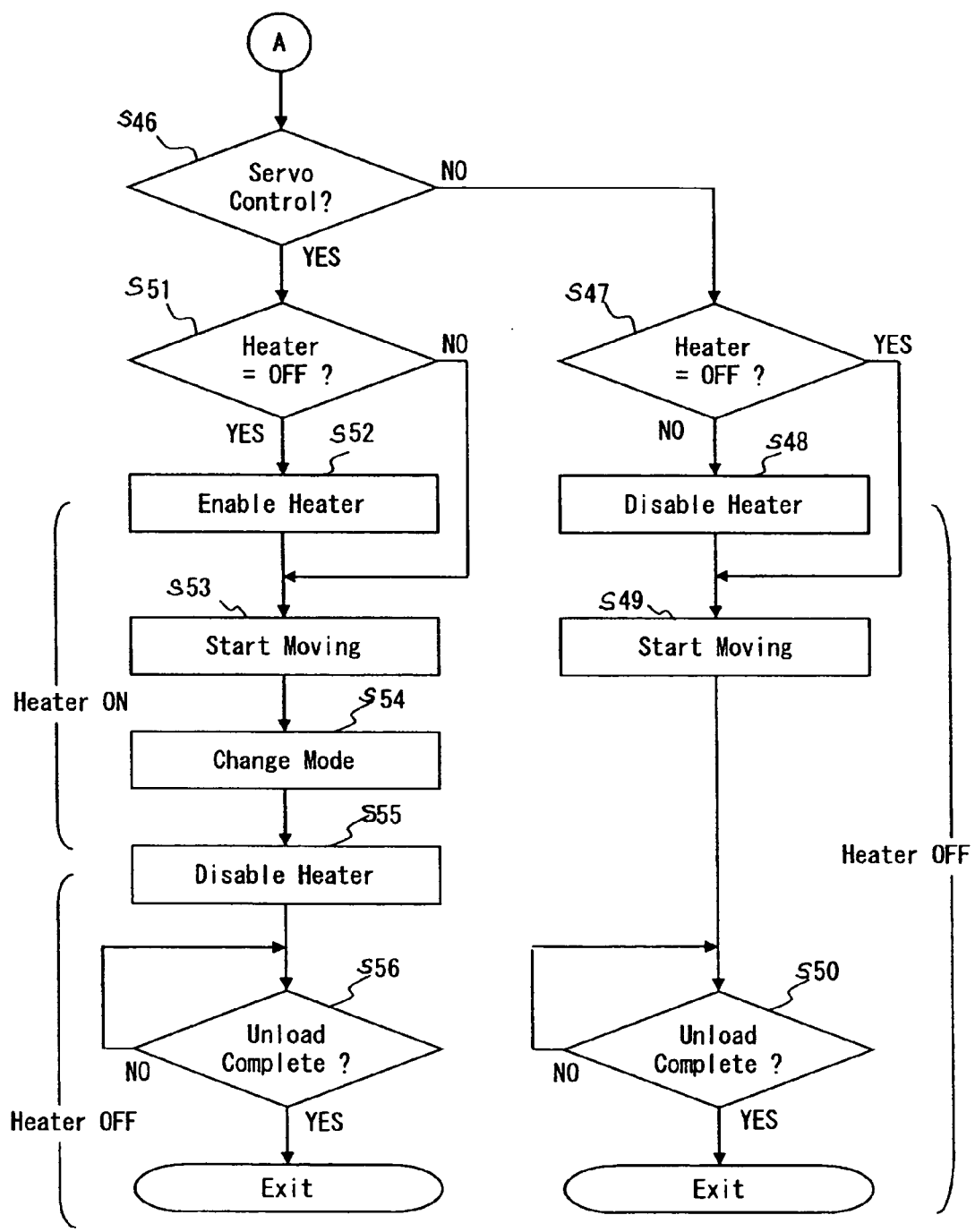
FIG. 12 is a flowchart showing how temperature-based heater control is done during unload in the present embodiment.

This unload process is described in detail with reference to flowcharts in FIGS. 11 and 12. The flowchart of FIG. 12 is connected to A in FIG. 11. In the first step of the unload process, the HDC/MPU 23 judges whether the environmental temperature is in the low temperature range by comparing the temperature from the temperature sensor 18 with the criterion temperature (S41). If out of the low temperature range (NO in S41), the HDD 1 executes steps S42 through S45 which are identical to steps S31 through S34 described with reference to FIG. 10.

If the environmental temperature is in the low temperature range (YES in S41), the HDC/MPU 23 selects an unload mode (S46) in FIG. 12. If the HDC/MPU 23 determines not to use the servo control mode (NO in S46), the HDD 1 performs steps S47 through S50 which are identical to S31 through S34 described with reference to FIG. 10. If it is determined to use the servo control mode (YES in S46), the HDC/MPU 23 judges whether the heater 124 is ON or OFF (S51).

If the heater 124 is found set to OFF (YES in S51), the HDC/IPU 23 sets the heater 124 to ON (S52). If the heater 124 is in ON state (YES in S51), the heater 124 is kept in ON state. With the heater 124 in ON state, the actuator 16 starts pivoting (S53). Then, the HDC/MPU 23 changes the unload mode from the servo control mode to the VCM current control mode (S54). In response to this mode change, the HDC/MPU 23 sets control data (Heater_ON/OFF) to the register set in the AE 13 to turn OFF the heater 124.

Then, with the heater 124 in OFF state, the actuator 16 is further pivoted toward the ramp 17. The tab 162 rides on the ramp 17 and reaches the parking position to complete the unload process (S55). Upon completion of the unload process (YES in S55), the HDC/MPU 23 exits the unload process and starts the subsequent process.

Thus, if the environmental temperature is in the low temperature range, the heater 124 is turned ON in the servo control mode. This enables accurate reading of servo data. In addition, the heater 124 is turned OFF when the mode is changed. This can reduce the possibility of collision between the head element section 122 and the magnetic disk 11. Turning OFF the heater 124 at this timing can effectively protect the head element section 122 since the possibility of collision between the head element section 122 and the magnetic disk 11 is particularly high when the tab 162 runs onto the ramp 17.

Although the present invention has so far been described by using a specific embodiment as an example, the present invention is not limited to the embodiment. Those skilled in the art can readily make modification, addition and alteration to each component of the embodiment without departing from the scope of the present invention. For example, the TFC of the present invention can be applied to an HDD where each head slider is provided with only one of read and write elements.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
a slider which flies above a spinning recording disk;
a head element section disposed on the slider;
a heater which is disposed on the slider and adjusts the clearance between the head element section and the recording disk by protruding the head element section through thermal expansion;
an actuator which carries the slider;
a ramp onto which a part of the actuator runs in order to retract the slider to the outside of the recording disk; and
a controller which in a process to load the retracted slider to the recording disk, keeps the heater in OFF state until a predetermined timing after the slider is moved to the recording disk and said part of the actuator is discharged from the ramp;
wherein the controller keeps the heater in OFF state until a predetermined number of servo data are read out by the head element section after the actuator starts to move.

2. The disk drive according to claim 1, further comprising a temperature sensor, to detect a temperature of the head element section,
wherein until a predetermined timing after the slider is moved to the recording disk and said part of the actuator is discharged from the ramp, the controller keeps the heater in OFF state if the detected temperature by the temperature sensor is not lower than a reference temperature, and keeps the heater in ON state if the detected temperature by the temperature sensor is lower than the reference temperature.

3. The disk drive according to claim 2, wherein:
the controller controls the current supplied to the heater so as to supply the largest current if the temperature is lower than a second reference temperature when user data is read out from the recording disk; and
the reference temperature for the load process is lower than the second reference temperature.

4. The disk drive according to claim 1, wherein the controller keeps the heater in OFF state until the load process is completed.

5. The disk drive according to claim 1, further comprising a temperature sensor to detect a temperature of the head element section,
wherein if the detected temperature by the temperature sensor is lower than a reference temperature, the controller turns ON the heater when a predetermined amount of time has passed after the actuator staffs to move.

6. The disk drive according to claim 5, wherein:
the controller controls the current supplied to the heater so as to supply the largest current if the detected temperature is lower than a second reference temperature when user data is read out from the recording disk; and
the reference temperature for the load process is lower than the second reference temperature.

7. A disk drive comprising:
a slider which flies above a spinning recording disk;
a head element section disposed on the slider;
a heater which is disposed on the slider and adjusts the clearance between the head element section and the recording disk by protruding the head element section through thermal expansion;
an actuator which carries the slider;
a ramp onto which a part of the actuator runs in order to retract the slider to the outside of the recording disk; and
a controller which in an unload process to unload the slider to the outside of the recording disk, keeps the heater in OFF state after the actuator staffs to move toward the ramp and reaches a parking position thereon;
wherein during the unload process, the controller drives and controls the actuator by using servo data read out from the recording disk and keeps the heater in ON state while the servo data is read out.

8. The disk drive according to claim 7, further comprising a temperature sensor to detect a temperature of the head element section,
wherein the controller keeps the heater ON if the detected temperature by the temperature sensor is lower than a reference temperature while the servo data is read out.

9. The disk drive according to claim 8, wherein:
the controller controls the current supplied to the heater so as to supply the largest current if the temperature is lower than a second reference temperature when user data is read out from the recording disk; and
the reference temperature for the unload process is lower than the second reference temperature.

10. The disk drive according to claim 7, wherein the controller keeps the heater OFF until the actuator reaches the parking position after the actuator starts to move in order to unload the slider to the outside of the recording disk.

11. A disk drive comprising:
a slider which flies above a spinning recording disk;
a head element section disposed on the slider;
a heater which is disposed on the slider and adjusts the clearance between the head element section and the recording disk by protruding the head element section through thermal expansion;
an actuator which carries the slider;
a ramp onto which a part of the actuator runs in order to retract the slider to the outside of the recording disk; and
a controller which in an unload process to unload the slider to the outside of the recording disk, keeps the heater in OFF state after the actuator staffs to move toward the ramp and reaches a parking position thereon;
wherein the unload process is provided with a servo-used mode which controls the actuator by using servo data on the recording disk and servo-not-used mode which controls the actuator without using the servo data, and the heater is kept ON in the servo-used mode and OFF in the servo-not-used mode.

12. A disk drive comprising:
a slider which flies above a spinning recording disk;
a head element section disposed on the slider;
a heater which is disposed on the slider and adjusts the clearance between the head element section and the recording disk by protruding the head element section through thermal expansion;
an actuator which carries the slider;
a ramp onto which a part of the actuator runs in order to retract the slider to the outside of the recording disk;
a controller which in an unload process to unload the slider to the outside of the recording disk, keeps the heater in OFF state after the actuator staffs to move toward the ramp and reaches a parking position thereon; and
a temperature sensor to detect a temperature of the head element section,
wherein the controller keeps the heater ON in the a servo-used mode if the detected temperature by the temperature sensor is lower than a reference temperature.

13. The disk drive according to claim 12, wherein:
when user data is read out from the recording disk, the controller controls the current supplied to the heater so as to supply the largest current if the detected temperature is lower than a second reference temperature; and
the reference temperature for the unload process is lower than the second reference temperature.

14. A control method in a disk drive having a slider which flies above a spinning recording disk; a head element section disposed on the slider and a heater which is disposed on the slider and adjusts the clearance between the head element section and the recording disk by protruding the head element section through thermal expansion, said method comprising:
driving the actuator so as to move the slider toward the spinning recording disk when a part of an actuator which carries the slider is set on a ramp; and
in a process to load a retracted slider to the recording disk, keeping the heater in OFF state until a predetermined timing after the slider is moved to the recording disk and said part of the actuator is discharged from the ramp;
detecting a temperature of the head element section; and
if the detected temperature is lower than a reference temperature, turning ON the heater when a predetermined amount of time has passed after the actuator staffs to move;
wherein when user data is read out from the recording disk, the largest current is supplied to the heater if the detected temperature is lower than a second reference temperature which is higher than the reference temperature for the load process.

15. The method according to claim 14, further comprising:
controlling the current supplied to the heater so as to supply the largest current if the detected temperature is lower than a second reference temperature when user data is read out from the recording disk;
wherein the reference temperature for the load process is lower than the second reference temperature.

\* \* \* \* \*

UNITED STATES PATENT AND TRADEMARK OFFICE
CERTIFICATE OF CORRECTION

PATENT NO. : 7,426,089 B2 Page 1 of 1
APPLICATION NO. : 11/521737
DATED : September 16, 2008
INVENTOR(S) : Wada et al.

It is certified that error appears in the above-identified patent and that said Letters Patent is hereby corrected as shown below:

Column 4, line 67, "1" should be deleted;

Column 8, line 1, the word "SI" change to "S1";

Column 8, line 63, the word "RJW" change to "R/W";

Column 13, line 48, the word "IPU" change to "MPU";

Column 16, claim 12, line 17, the word "staffs" change to "starts".

Signed and Sealed this

Twenty-fifth Day of November, 2008

JON W. DUDAS
*Director of the United States Patent and Trademark Office*